(12) United States Patent
Naik et al.

(10) Patent No.: US 11,896,899 B1
(45) Date of Patent: Feb. 13, 2024

(54) TECHNIQUES FOR PROVIDING NETWORK APPLICATIONS

(71) Applicant: Amazon Technologies, Inc., Seattle, WA (US)

(72) Inventors: Kunjan Shridhar Naik, Redondo Beach, CA (US); Brian Fisher, Lake Forest, CA (US); Mickey Ottis Williams, Fallbrook, CA (US); Clifford Julius Berger, Seattle, WA (US); Skyler J. Brown, Marina del Rey, CA (US); Peter Han, Chino Hills, CA (US); Greg Roberts, La Jolla, CA (US)

(73) Assignee: Amazon Technologies, Inc., Seattle, WA (US)

( * ) Notice: Subject to any disclaimer, the term of this patent is extended or adjusted under 35 U.S.C. 154(b) by 439 days.

(21) Appl. No.: 17/321,461

(22) Filed: May 16, 2021

(51) Int. Cl.
| | |
|---|---|
| *A63F 13/48* | (2014.01) |
| *A63F 13/358* | (2014.01) |
| *A63F 13/75* | (2014.01) |
| *G06F 16/172* | (2019.01) |
| *G06F 9/451* | (2018.01) |
| *G06F 8/61* | (2018.01) |
| *H04L 67/131* | (2022.01) |
| *H04L 67/568* | (2022.01) |

(52) U.S. Cl.
CPC ............ *A63F 13/48* (2014.09); *A63F 13/358* (2014.09); *A63F 13/75* (2014.09); *G06F 8/61* (2013.01); *G06F 9/451* (2018.02); *G06F 16/172* (2019.01); *H04L 67/131* (2022.05); *H04L 67/568* (2022.05); *A63F 2300/534* (2013.01); *A63F 2300/5586* (2013.01); *A63F 2300/636* (2013.01)

(58) Field of Classification Search
CPC ........ A63F 13/48; A63F 13/358; A63F 13/75; A63F 2300/534; A63F 2300/5586; A63F 2300/636; G06F 9/451; G06F 16/172; G06F 8/61; H04L 67/131; H04L 67/568
See application file for complete search history.

(56) References Cited

U.S. PATENT DOCUMENTS

| | | | |
|---|---|---|---|
| 11,169,858 B2 * | 11/2021 | Fear ....................... | A63F 13/49 |
| 2012/0278439 A1 * | 11/2012 | Ahiska ................... | A63F 13/77 |
| | | | 709/218 |

(Continued)

*Primary Examiner* — William H McCulloch, Jr.
*Assistant Examiner* — Ankit B Doshi
(74) *Attorney, Agent, or Firm* — Lee & Hayes, P.C.

(57) ABSTRACT

This disclosure describes, in part, techniques for providing network applications. For instance, system(s) may install a network application on a first virtual server. The system(s) may then receive first data representing events that occurred during a first launching of the network application on the first virtual server. Using the events, the system(s) may generate second data for optimizing a second launching of the network application on a second virtual server and store the second data in one or more databases. As such, after installing the network application on the second virtual server, the system(s) may provide the second virtual server with the second data so that the second virtual server may use the second data to optimize the second launching of the network application. In some examples, using the second data reduces the amount of time that it takes for the second virtual server to launch the network application.

20 Claims, 11 Drawing Sheets

(56) References Cited

U.S. PATENT DOCUMENTS

| | | | |
|---|---|---|---|
| 2015/0126282 A1* | 5/2015 | Hitomi | A63F 13/355 463/42 |
| 2015/0127774 A1* | 5/2015 | Hitomi | H04L 65/60 709/219 |
| 2015/0128293 A1* | 5/2015 | Hitomi | G06F 21/105 726/29 |

* cited by examiner

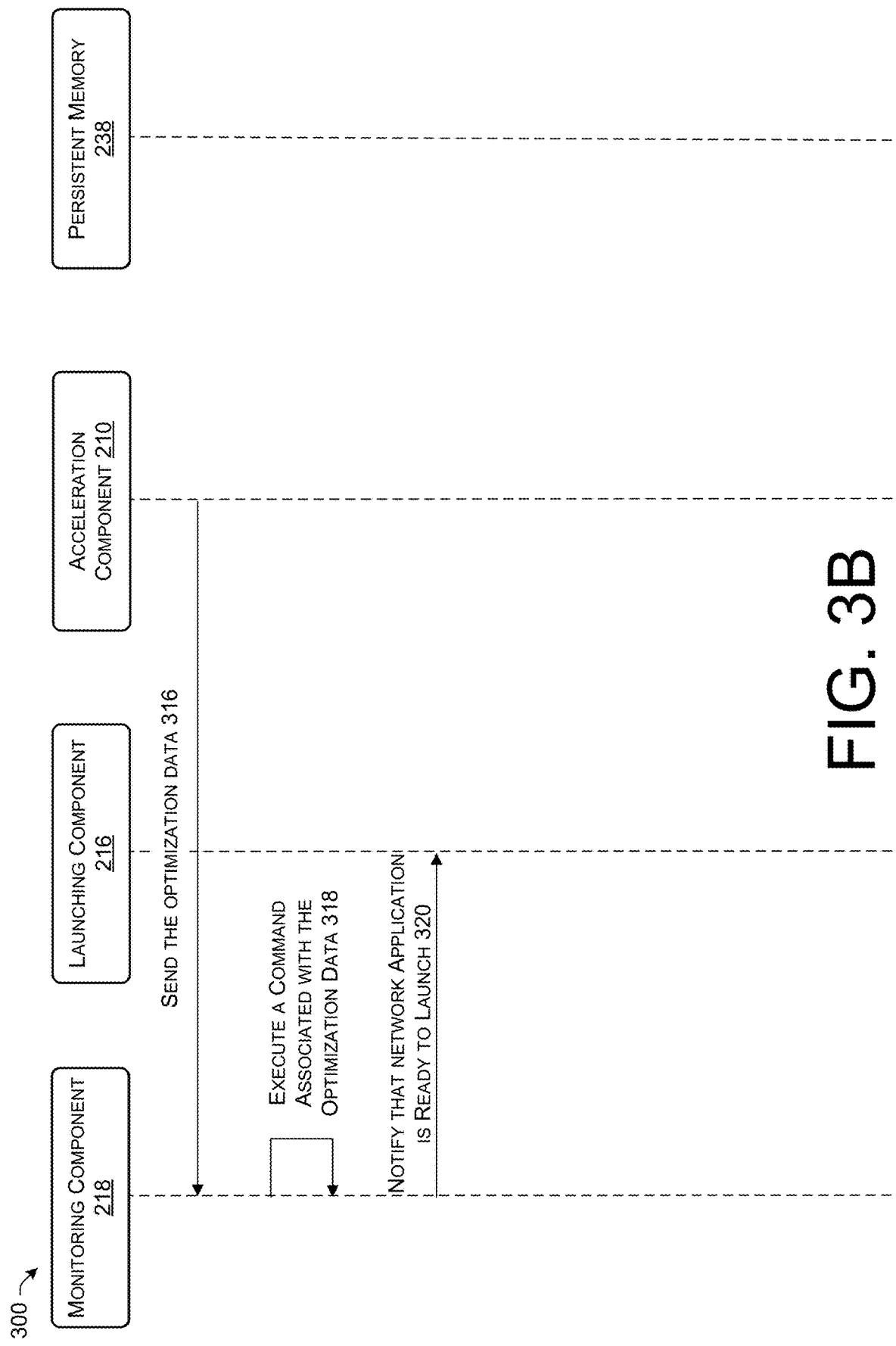

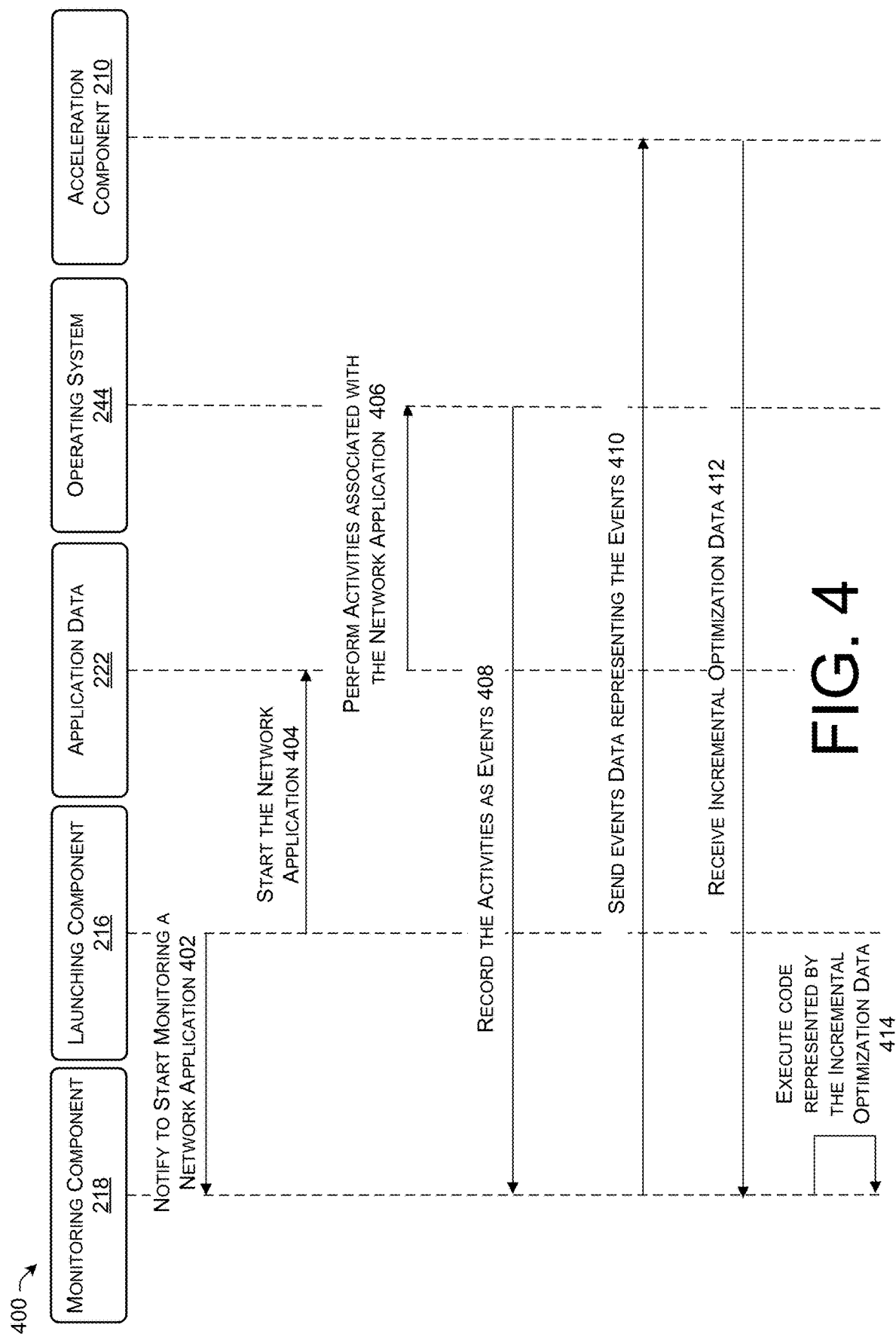

700 ↴

(7A)

↓

RETRIEVE THE OPTIMIZATION DATA FROM THE ONE OR MORE DATABASES
716

↓

CAUSE, USING THE OPTIMIZATION DATA, ONE OR MORE PROCESSES TO OCCUR BEFORE A SECOND LAUNCHING OF THE NETWORK APPLICATION
718

↓

RECEIVE, FROM A SECOND USER DEVICE, A SECOND REQUEST TO ACCESS THE NETWORK APPLICATION
720

↓

CAUSE THE SECOND LAUNCHING OF THE NETWORK APPLICATION ON THE SECOND VIRTUAL SERVER
722

FIG. 7B

TECHNIQUES FOR PROVIDING NETWORK APPLICATIONS

BACKGROUND

As gaming has become popular, companies have created new techniques, such as network accessible systems, that allow users to play various types of games. For example, a system, which may be wirelessly connected to a television via network(s), may cause the television to display content related to a state of a game. While the television is displaying the content, the system may receive, via the network(s), inputs from a video game controller and update, using the inputs, the state of the game being displayed by the television. However, based on the number of users that attempt to play the same game, the system may need to create multiple instances for accessing the game. This way, each of the users is able to connect to a respective instance in order to play the game.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 3A-3B illustrate an example process for performing optimization processes before launching a network application, in accordance with examples of the present disclosure.

FIG. 4 illustrates an example process for launching and then executing the network application from FIGS. 3A-3B, in accordance with examples of the present disclosure.

FIGS. 7A-7B illustrate an example process for using events from a first launching of a network application on a first virtual server in order to optimize a second launching of the network application on a second virtual server, in accordance with examples of the present disclosure.

DETAILED DESCRIPTION

Figure 1:
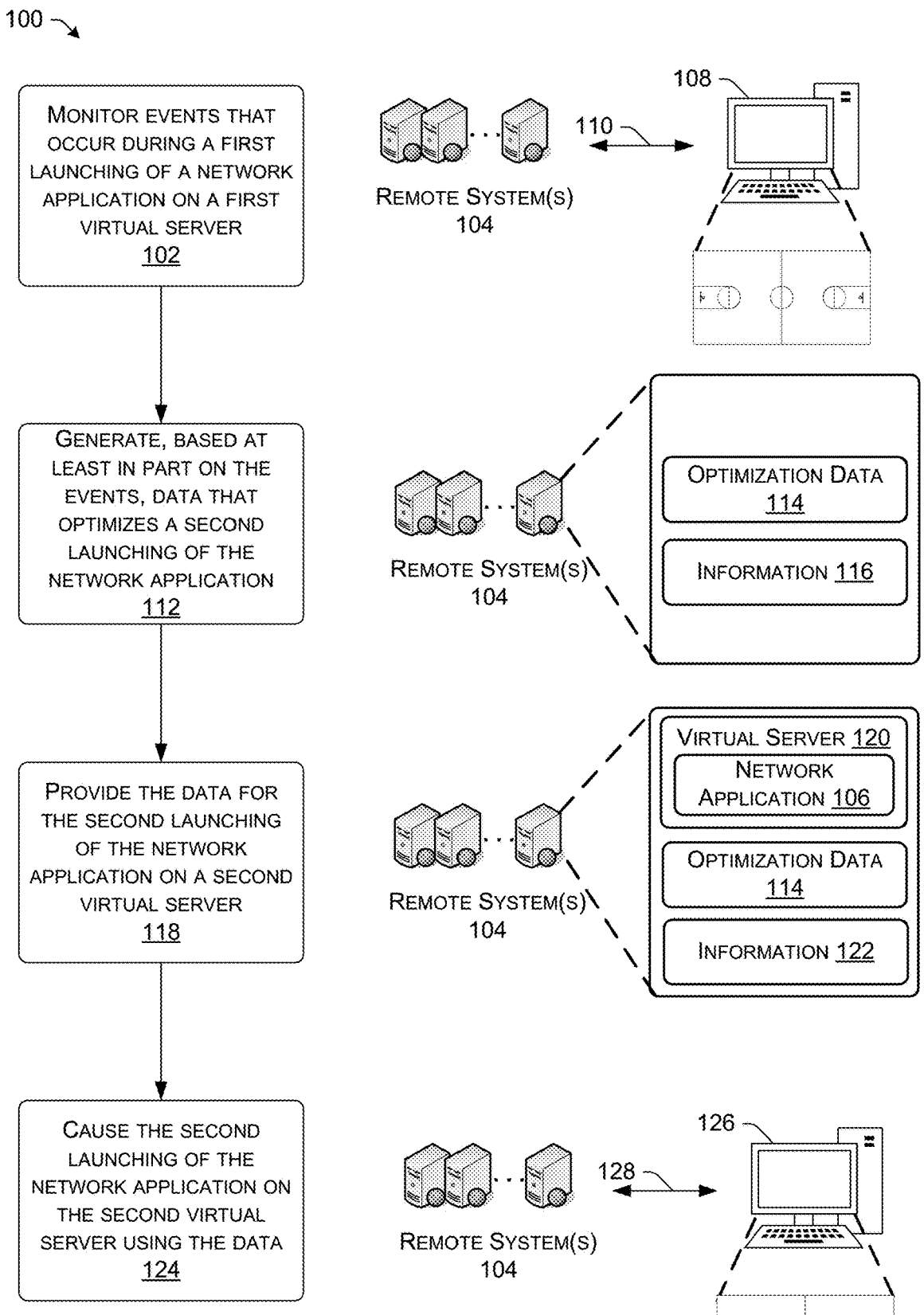
FIG. 1 illustrates an example process for optimizing a launching of a network application, in accordance with examples of the present disclosure.

This disclosure describes, in part, techniques for optimizing launching of network applications. For instance, after installing a network application on a virtual server, remote system(s) may monitor a launching of the network application on the virtual server in order to identify events that occur during the launching process. The remote system(s) may then use the events to generate data that optimizes the launching of the network application. In some examples, the data optimizes the launching of the network application by representing code which, when executed, reduces the amount of time it takes to launch the network application. For example, after generating the data, the remote system(s) may install the network application on additional virtual servers. These additional virtual servers may then execute the code represented by the data, which causes the additional virtual servers to perform processes for optimizing the launching of the network application on the additional virtual servers. This way, the remote system(s) are able to utilize the events that occurred during the initial launching of the network application on the virtual server in order to generate the data that optimizes the launching of the network application on the additional virtual servers.

For more detail, the remote system(s) may create a virtual server (referred to, in these examples, as a "first virtual server"). As described herein, a virtual server may include a server (e.g., a computer and server programs) that executes at a remote location and is used to run applications. For example, the virtual server may include one or more dedicated computing resources, such as central processing units (CPUs), memory (e.g., random-access memory (RAM), cache memory, etc.), network capacity, and/or the like for running and providing the applications. The remote system(s) may then install the network application onto the first virtual server. In some instances, installing the network application may include at least installing software files, registry keys, services, protection software, a shader cache, and/or other resources associated with the network application. Additionally, after the network application is installed, the remote system(s) may cause the network application to launch, execute, and/or terminate on the first virtual server.

The remote system(s) (and/or the first virtual server) may monitor the launching, the executing, and/or the terminating of the network application in order to identify the occurrences of events. In some examples, the events may include each of the processes that were created and/or executed during the launching, the executing, and/or the terminating of the network application. For example, the events may include, but are not limited to, files that are loaded by the network application, files created during the launching of the network application, files created during the execution of the network application, registries created, registries updated, dependencies on other applications and/or network resources, other application dependent files that are read, written, updated, and/or executed, protection software that protects against malicious activities (e.g., anti-cheat software), a shader cache that is downloaded and/or generated, user data (e.g., entitlements, game saves, etc.) that is generated and/or retrieved for the network application, and/or any other type of process that occurs during the launching, the executing, and/or the terminating of the network application. In some examples, the remote system(s) may then filter the events in order to identify specific types of events for optimizing the launching of the network application.

The remote system(s) may then analyze the events in order to determine how to optimize the launching of the network application. In some examples, the remote system(s) analyze the events by identifying event(s) that caused delays in the launching of the network application on the first virtual server. For a first example, the remote system(s) may analyze the events in order to identify file(s) that take the longest to load during the launching of the network application. In some examples, the remote system(s) identify a set number of files (e.g., one file, two files, five files, ten files, and/or etc.) that take the longest period(s) of time to load. Additionally, or alternatively, in some examples, the remote system(s) identify file(s) that loading period(s) exceeded a threshold period of time (e.g., ten seconds, thirty seconds, one minute, two minutes, etc.). In either of the examples, the remote system(s) may then generate code representing commands to preload these file(s) before launching the network application. In some examples, the code may represent hash function(s) for preloading these file(s) into a memory.

For a second example, the remote system(s) may analyze the events in order to identify protection software, which is downloaded, and protects against malicious activities. In some examples, such as when the network application includes a network game, the protection software may include anti-cheat software downloaded by the first virtual server, where the anti-cheat software analyzes file(s) of the network game in order to determine if the file(s) were maliciously altered. The remote system(s) may then generate code representing commands to pre-download this protection software and/or preload the file(s) that this software analyzes for the malicious activities. For a third examples, the remote system(s) may analyze the events in order to determine that a shader cache was downloaded and/or generated during the launching and/or execution of the network application. The remote system(s) may then generate code representing commands to download and/or generate the shader cache before the launching of the network application.

For a fourth example, the remote system(s) may analyze the events in order to identify that the network application depends on other application(s) and/or network service(s). The remote system(s) may then generate code representing commands to pre-download and/or preinstall these other application(s) and/or network service(s). Still, for a fifth example, the remote system(s) may analyze the events in order to identify registries that were created and/or updated by the network application. The remote system(s) may then generate code representing commands to generate and/or update the registries before launching the network application. While these are just a couple example processes that the remote system(s) may identify for optimizing the launching, the executing, and/or the terminating of the network application using the events, in other examples, the remote system(s) may identify additional and/or alternative processes.

In some examples, the remote system(s) may use inputs from one or more users when determining the processes for optimizing the launching, the executing, and/or the terminating of the network application. For example, the remote system(s) may generate a user interface that includes information describing the events. For instance, the user interface may include information describing the files that were loaded during the launching of the network application, the amounts of time that it took for the files to be loaded, the numbers of processes that accessed the files, and/or any other information. The remote system(s) may then send user interface data representing the user interface to an electronic device. Using the user interface data, the electronic device may display the user interface to a user. The electronic device may then receive inputs representing processes for optimizing the launching, the executing, and/or the terminating of the network application.

For example, the electronic device may receive inputs associated with preloading one or more files, inputs associated with downloading the protection software that protects against malicious activities, inputs associated with down-loading the shader cache, inputs associated with retrieving user data that is associated with the network application, and/or inputs representing one or more additional and/or alternative optimization processes. The remote system(s) may then receive, from the electronic device, data representing the inputs and/or data representing the optimization processes input by the user.

The remote system(s) may then generate data (referred to, in these examples, as "optimization data") representing the code for optimizing the launching, the executing, and/or the terminating of the network application. After generating the optimization data, the remote system(s) may store the optimization data in one or more databases. Additionally, in some examples, the optimization data may be specific to the network application and/or the version of the network application. As such, the remote system(s) may generate and/or receive information (referred to, in these examples, as "application information") associated with the network application. As described herein, application information may represent, but is not limited to, binaries associated with the network application, files associated with the network application, a resolution of the network application, graphics quality settings of the network application, display settings associated with the network application, artifacts that depend on progress through the network application, a graphics adapter, systems devices that are required, and/or the like. The remote system(s) may then store the application information in associated with the optimization code.

Furthermore, in some examples, the optimization data may be specific to the hardware and/or software associated with the first virtual server. The hardware and/or software may include, but are not are not limited to, a number of CPU cores, an amount of RAM, a type, size and/or count of attached volumes, an operating system of the first virtual server, bundled drivers of the first virtual server, application programming interface(s) (API(s)) associated with the first virtual server, third-party application(s) installed on the first virtual server, and/or any other hardware and/or software. As such, the remote system(s) may generate and/or receive information (referred to, in some examples, as "system information") representing the hardware and/or software. The remote system(s) may then store the system information in association with the optimization code.

After generating the optimization data, the remote system(s) are able to use the optimization data in order to optimize the launching, the executing, and/or the terminating of the network application on other virtual servers. For example, and for a virtual server (referred to, in these examples, as a "second virtual server"), the remote system(s) may cause the network application to be installed on the second virtual server. The remote system(s) may then retrieve the optimization data associated with the network application and provide the second virtual server with the optimization data. In some examples, the remote system(s) retrieve the optimization data using information associated with the network application and/or the second virtual server.

For a first example, the remote system(s) may generate and/or receive additional application information associated with the network application installed on the second virtual server. The remote system(s) may then compare the additional application information to the application information that is stored in association with the optimization data. If the remote system(s) determine that the additional application information is similar to the application information that is stored in association with the optimization data, then the remote system(s) may determine that the second virtual server may use the optimization data for the launching, the executing, and/or the terminating the network application. However, if the remote system(s) determine that the additional application information is not similar to the application information that is stored in association with the optimization data, then the remote system(s) may determine that the second virtual server may not use the optimization data for the launching, the executing, and/or the terminating the network application.

For a second example, and additionally to, or alternatively from using the additional application information, the remote system(s) may generate and/or receive additional system information associated with the hardware and/or software of the second virtual server. The remote system(s) may then compare the additional system information to the system information that is stored in association with the optimization data. If the remote system(s) determine that the additional system information is similar to the system information that is stored in association with the optimization data, then the remote system(s) may determine that the second virtual server may use the optimization data for the launching, the executing, and/or the terminating the network application. However, if the remote system(s) determine that the additional system information is not similar to the system information that is stored in association with the optimization data, then the remote system(s) may determine that the second virtual server may not use the optimization data for the launching, the executing, and/or the terminating the network application.

As described herein, in some examples, the remote system(s) may determine that first information is similar to second information when the first information matches the second information. For example, the remote system(s) may determine that the additional system information is similar to the system information when number of CPU codes, the amount of RAM, the operating system, and/or the like indicated by the additional system information is the same as the number of CPU cores, the amount of RAM, the operating system, and/or the like indicated by the system information. Alternatively, in some examples, the remote system(s) may determine that the first information is similar to the second information when at least a portion of the first information matches the second information. For example, the remote system(s) may determine that the additional system information is similar to the system information when number of CPU cores and the operating system indicated by the additional system information is the same as the number of CPU cores and the operating system indicated by the system information, but the amount of RAM indicated by the additional system information is different than the amount of RAM indicated by the system information.

The remote system(s) may then cause a launching of the network application on the second virtual server. Before and/or during the launching, the second virtual server may use the optimization data to optimize the launching of the network application. For a first example, if the code represents the commands to preload file(s) before the launching the network application, then the second virtual server may preload the file(s) before the launching the network application. In some examples, the second virtual server may preload the file(s) in a cache associated with the operating system. This may reduce the number of times that the operating system has to read from a disk when launching the network application, which may reduce the total time that it takes to launch the network application.

For a second example, if the code represents the commands to pre-download the protection software that protects against malicious activities and/or preload the files that this protection software analyzes for the malicious activities, then the second virtual server may pre-download the software and/or preload the files. This way, the software may begin to analyze the files before the launching of the network application and/or during the initial processes of the launching. For a third example, if the code represents the commands to download and/or generate the shader cache, the second virtual server may download and/or generate the shader cache before the launching of the network application and/or during the initial processes of the launching. This way, the second virtual server does not have to wait for the downloading and/or generating of the shader cache while launching the network application.

For a fourth example, if the code represents commands to pre-download and/or preinstall other application(s) and/or network service(s), then the remote system(s) may pre-download and/or preinstall these other application(s) and/or network service(s). For a fifth example, if the code represents commands to generate and/or update the registries before the launching the network application, then the remote system(s) may generate and/or update the registries before the launching of the network application. Still, for a fifth example, if the code represents commands to retrieve user data that is associated with the network application, then the remote system(s) may retrieve the user data before the launching the network application. While these are just a couple of example processes that the second virtual server may perform for optimizing the launching, the executing, and/or the terminating of the network application using the optimization data, in other examples, the second virtual server may perform additional and/or alternative processes.

In some examples, the remote system(s) (and/or the second virtual server) may monitor the launching, the executing, and/or the terminating of the network application in order to identify additional events. For example, if a user of the network application advances further in the network application than other users (e.g., the user reaches a game level that others users have yet to reach), the remote system(s) (and/or the second virtual server) may monitor the executing of the network application in order to identify additional events that occur. The remote system(s) may then perform the processes described above to continue to generate new optimization data using these additional events. In other words, the remote system(s) (and/or virtual servers) may continue to monitor the launching, the executing, and/or the terminating of the network application in order to continue identifying events that the remote system(s) may use to generate optimization data for the network application.

The remote system(s) and/or additional virtual servers may then perform similar processes in order to optimize the launching, the executing, and/or the terminating of the network application on the additional virtual servers. Additionally, in some examples, the remote system(s) may perform similar processes in order to generate optimization data for different versions of the network application (although the same optimization data may work for multiple versions of the network application), different network applications, and/or different versions of virtual servers (e.g., virtual servers that include different hardware and/or software). In other words, the remote system(s) may perform the processes above in order to optimize the launching, the executing, and/or the terminating of various network applications for various types of virtual servers.

In the examples above, the remote system(s) (and/or the virtual servers) may launch the network application when a user requests to access the network application. For example, once the installation of the network application onto a virtual server complete, a user is then able to access the network application using the virtual server. For instance, the remote system(s) may receive, from a user device, a request to access the network application. Based on the request, the remote system(s) may assign the user device to the virtual server that is associated with the network application. The virtual server may then begin to launch the network application for the user using one or more of the processes described herein. The remote system(s) (and/or the virtual server) then provide the user with content associated with the network application.

For instance, the remote system(s) may send, to the user device, data (e.g., video data, audio data, etc.) representing a first state of the network application. For example, if the network application includes a network game, the first state of the network application may include an object (e.g., a character) located at a first position within a gaming environment (e.g., a forest). The user device may receive the data from the remote system(s) and, using the data, the user device may display image(s) representing the first state of the network application. For example, and again if the network application includes the network game, the user device may display content representing the object located at the first position within the gaming environment. In some examples, the user device may further output sound represented by the audio data. The user may then use the user device and/or a separate control device to provide inputs to the network application via the remote system(s).

For example, the control device may receive an input, such as a selection of a button, joystick, key, touch-sensitive pad, sensor, and/or the like associated with the control device. The control device may then send, to the remote system(s), data representing the input. Using the data, the remote system(s) may update the first state of the network application to a second state of the network application. For example, and again if the network application includes the network game, the input may be associated with moving the object forward by a given amount within the gaming environment. As such, the remote system(s) may update the first state of the of the network application to the second state of the network application by moving the object forward in the environment by the given amount.

The remote system(s) may then send, to the user device, data (e.g., video data, audio data, etc.) representing the second state of the network application. Using the data, the user device may display image(s) representing the second state of the game. For example, the user device may display content representing the object located at the second position within the gaming environment. Additionally, in some instances, the user device may output sound represented by the audio data. The remote system(s) may then continue to perform similar processes to update the state of the network application on the user device as the remote system(s) continues to receive data from the control device.

Additionally, and as described above, the remote system(s) may initially install the network application onto the virtual servers. In some examples, the remote system(s) may install the network application onto the virtual servers using virtual storage devices. As described herein, a virtual storage device may include a storage volume, such as an Elastic Block Store (EBS), that is stored remotely (e.g., a cloud-based storage) from user devices. In some examples, the remote system(s) may generate different types of virtual storage devices. For example, the remote system(s) may generate solid-state drives, hard disk drive, and/or any other type of remote storage drives. After the remote system(s) generate a virtual storage device, the remote system(s) can create a file system on the virtual storage device, run a database on the virtual storage device, store a network application on the virtual storage device, and/or perform one or more additional and/or alternative processes with the virtual storage device.

The remote system(s) may then associate (e.g., attach) one or more virtual storage devices to a virtual server. In some examples, associating the one or more virtual storage devices to the virtual server may cause the virtual server to begin installing the network application (and/or one or more other applications) onto the virtual server. As described above, in some examples, installing the network application may include at least installing software files, registry keys, services, protection software, a shader cache, and/or other resources associated with the network application. Once the network application is installed, the virtual server may then be ready to launch the network application for a user. As such, by performing these processes to install and then launch the network application, the virtual server may be launching the network application for a first time when the user accesses the network application using the virtual server. This may be why performing the processes described above reduces the amount of time that it takes to launch, execute, and/or terminate the network application on the virtual server.

While the examples above describe installing the network application before receiving the request to access the network application and then launching the network application after receiving the request to access the network application, in other examples, the remote system(s) may install and/or launch the network application at different times. For a first example, the remote system(s) may install and launch the network application before receiving the request. In such an example, the remote system(s) may cause the network application to remain at a first state, such as a first screen, until receiving the request. For a second example, the remote system(s) may both install and launch the network application after receiving the request.

Additionally, while the examples above describe generating optimization data that may be used by all network applications, in other examples, the remote system(s) may generate optimization data that is specific to a user profile. For example, the remote system(s) may perform the processes above to monitor a first launching and/or executing of a network application for a user profile. The remote system(s) may then generate optimization data using the events and store the optimization data in association with the user profile. As such, the next time that the network application is launched for the user profile, the remote system(s) may use that optimization data to optimize the launching and/or executing of the network application. This way, the optimization data is customized for the user profile, such as to include entitlements and/or game saves that are associated with the user profile.

Furthermore, while the examples above describe installing and/or launching a separate instance network application on a virtual server, in other examples, multiple instances of the network application may be installed and/or launched on a single virtual server.

As described herein, a file may include, but is not limited to, a JavaScript Object Notation (JSON) file, a Batch file, a Hypertext Markup Language (HTML) file, an Extensible Markup Language (XML) file, an executable (EXE) file, a dynamic link library (DLL) file, a log file, a zip file, and/or any other file format type. Additionally, as described herein, the remote system(s) (and/or the virtual servers) may use any type of tool that tracks various process activity to monitor the events.

FIG. 1 illustrates an example process 100 for launching a network application, in accordance with examples of the present disclosure. At 102, the process 100 may include monitoring events that occur during a first launching of a network application on a first virtual server. For instance, remote system(s) 104 may install the network application 106 onto the first virtual server. In some instances, installing the network application 106 may include at least installing software files, registry keys, services, protection software, a shader cache, and/or other resources associated with the network application 106 on the first virtual server. After the network application 106 is installed, the remote system(s) 104 may receive, from a first user device 108, a request to access the network application 106. For example, if the network application 106 includes a network game, then the request may be to play the network game. Based on receiving the request, the remote system(s) 104 may connect the first user device 108 with the first virtual server, which is illustrated by 110.

The remote system(s) (and/or the first virtual server) may then monitor the first launching (and/or the executing, the terminating, etc.) of the network application 106 on the first virtual server in order to identify events. As described above, the events may include each of the processes that were created and/or executed during the first launching (and/or the executing, the terminating, etc.) of the network application 106. In some examples, the remote system(s) (and/or the first virtual server) may then filter the events in order to identify specific types of events for optimizing the launching (and/or the executing, the terminating, etc.) of the network application 106. For example, the remote system(s) 104 (and/or the first virtual server) may filter the events in order to identify file loading events, file creating events, registry events, application 106 dependency events, protection software events, shader cache events, and/or any other type of event. The remote system(s) 104 (and/or the first virtual server) may also determine times that the events occurred.

Additionally, and as shown by the example of FIG. 1, the remote system(s) 104 (and/or the first virtual server) may send data (e.g., video data, audio data, etc.) to the first user device 108 and/or receive data (e.g., input data) from the first user device 108. In the example of FIG. 1, the network application 106 includes a network game, such as a sports game. However, in other examples, the network application 106 may include any other type of application 106.

At 112, the process 100 may include generating, based at least in part on the events, data that optimizes a second launching the network application 106. For instance, the remote system(s) 104 may analyze the events in order to generate optimization data 114 for optimizing the second launching of the network application 106, such as on other virtual servers. As described herein, the optimization data 114 may represent codes, such as commands, for optimizing the second launching (and/or the executing, the terminating, etc.) of the network application 106. For example, the codes may represent commands to preload files, create files, download files, preload software, download software, download a shader cache, register the network application 106, and/or perform one or more other processes for optimizing the second launching (and/or executing, terminating, etc.) of the network application 106. In some examples, at least a portion of these commands are configured to be executed before the second launching of the network application 106.

The remote system(s) may then cause the optimization data 114 to be stored in one or more databases. Additionally, in some examples, the remote system(s) 104 may also generate and/or receive first application information 116 associated with the network application 106 and/or first system information 116 associated with the first virtual server. In such examples, the remote system(s) 104 may cause the first application information 116 and/or the first system information 116 to be stored in the one or more database and in association with the optimization data 114.

At 118, the process 100 may include providing the data for the second launching of the network application 106 on a second virtual server. For instance, the remote system(s) 104 may cause an installation of the network application 106 on the second virtual server 120. In some instances, installing the network application 106 may include at least installing the software files, the registry keys, the services, the protection software, the shader cache, and/or the other resources associated with the network application 106 on the second virtual server 120. The remote system(s) 104 may then generate and/or receive second application information 122 associated with the network application 106 and/or second system information 122 associated with the second virtual server 120. The remote system(s) 104 may then compare the second information 122 to the first information 116 and, based on the comparison, determine that the second information 122 is similar to the first information 116.

For a first example, the remote system(s) 104 may determine, based on the comparison, that the number of CPU cores, the amount of RAM, the operating system, and/or the like associated with the second virtual server 120 are similar to the number of CPU cores, the amount of RAM, the operating system, and/or the like associated with the first virtual server. For a second example, the remote system(s) 104 may determine, based on the comparison, that the game resolution, the graphics quality settings, the system display settings, and/or the like associated with the network application 106 on the second virtual server 120 are similar to the game resolution, the graphics quality settings, the system display settings, and/or the like associated with the network application 106 on the first virtual server. In either of the examples, based on the determination, the remote system(s) 104 may identify the optimization data 114. The remote system(s) 104 may then provide the second virtual server 120 with the optimization data 114.

At 124, the process 100 may include causing the second launching of the network application on the second virtual server using the data. For instance, before the second launching of the network application 106, the second virtual server 120 may run through the code represented by the optimization data 114 in order to perform the optimization processes represented by the code. Based on running through the code, the second virtual server 120 may preload the files, create the files, download the files, preload the software, download the software, download the shader cache, register the network application 106, and/or perform one or more other processes for optimizing the second launching (and/or executing, terminating, etc.) of the network application 106. Either during and/or after running through the code, the remote system(s) 104 may receive, from a second user device 126, a request to access the network application 106. For example, and again if the network application 106 includes a network game, then the request may be to play the network game. Based on receiving the request, the remote system(s) 104 may connect the second user device 126 with the second virtual server 120, which is illustrated by 128.

Additionally, and as shown by the example of FIG. 1, the remote system(s) 104 (and/or the second virtual server 120) may send data (e.g., video data, audio data, etc.) to the second user device 126 and/or receive data (e.g., input data) from the second user device 126. As above, in the example of FIG. 1, the network application 106 includes the network game, such as the sports game. However, in other examples, the network application 106 may include any other type of application 106.

While the example of FIG. 1 describes initially launching the network application 106 on the first virtual server in order to monitor for the events and then using the optimization data 114 to launch the network application 106 on the second virtual server 120, in other examples, the remote system(s) 104 may use the optimization data 114 to again launch the network application 106 on the first virtual server. Additionally, in other examples, the remote system(s) 104 may send the optimization data 114 to a computing resource other than a virtual server, such as a user device, and the other computing resource may use the optimization data 114 to optimize the launching, the executing, and/or the terminating of the network application 106.

Figure 2:
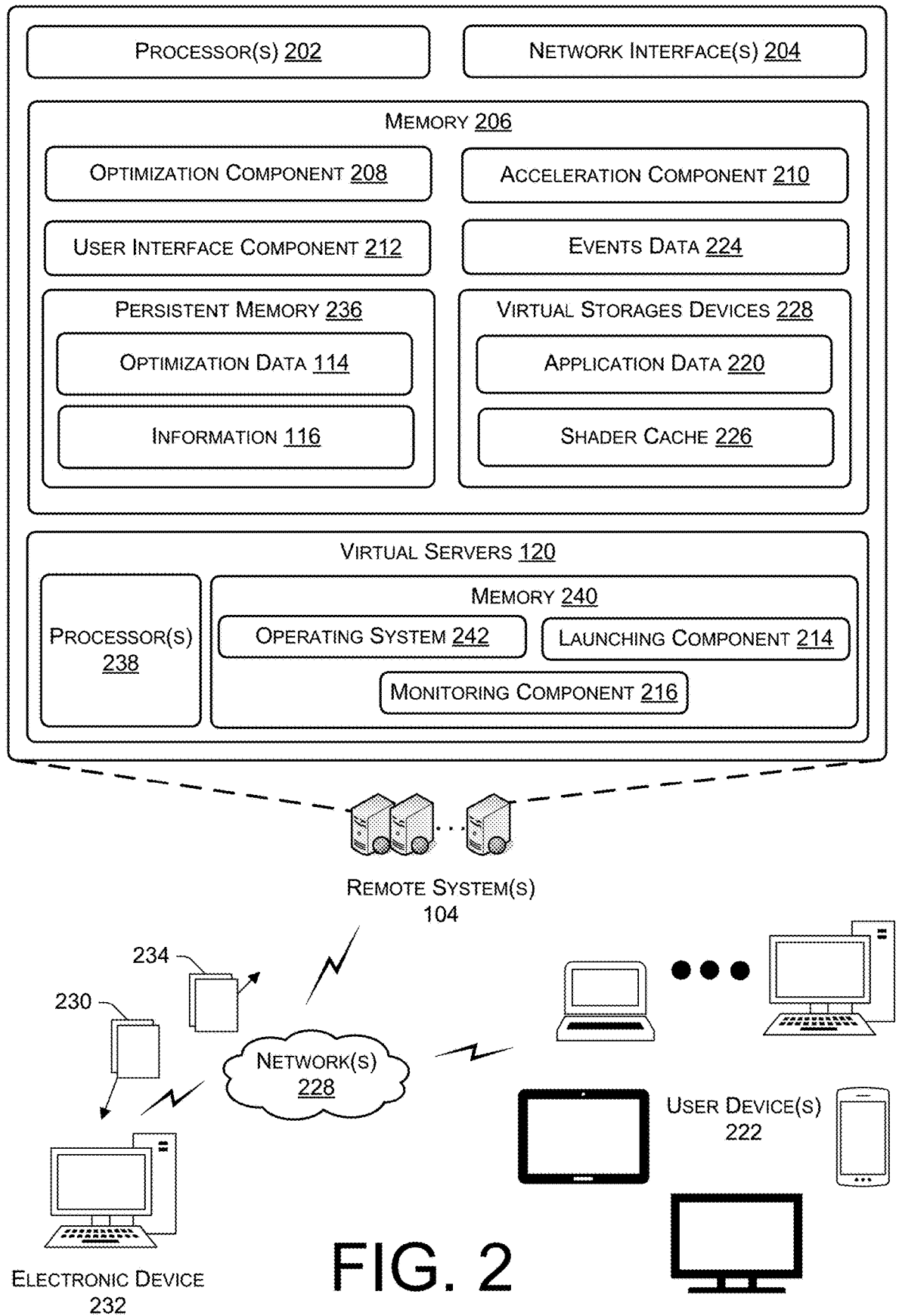
FIG. 2 illustrates a block diagram of an example architecture of remote system(s), in accordance with examples of the present disclosure.

FIG. 2 illustrates a block diagram of an example architecture of the remote system(s) 104, in accordance with examples of the present disclosure. As shown, the remote system(s) 104 include at least one or more processors 202, one or more network interfaces 204, and memory 206. Additionally, the remote system(s) 104 may store, in the memory 206, an optimization component 208, an acceleration component 210, and a user interface component 212. However, in other examples, the remote system(s) 104 may include additional and/or alternative components than the components 208-212 illustrated in the example of FIG. 2. For example, two or more of the components 208-212 may be combined into a single component. For another example, in additional to, or alternatively from the virtual servers 120 storing a launching component 214 and a monitoring component 216, the remote system(s) 104 may further store the launching component 214 and/or the monitoring component 214 in the memory 206.

As shown, the remote system(s) 104 may include virtual storage devices 218 that store application data 220 representing network applications, such as the network application 106. For example, the application data 22 may represent the files, folders, binary, code, graphics, content, audio, registry keys, services, protection software, a shader cache, and/or the like associated with the network application. The remote system(s) 104 may then use the virtual storage devices 218 to install the network applications onto the virtual server 120. In some examples, the remote system(s) 104 install a network application onto a virtual server 120 by associating (e.g., attaching) one or more of the virtual storage devices 218 with the virtual server 120. In some examples, associating the one or more virtual storage devices 218 with the virtual server 120 may cause the virtual server 120 to install the application data 220 onto the virtual server 120. As described herein, installing the network application may include at least installing software files, registry keys, services, protection software, the shader cache, and/or other resources associated with the network application.

In the example of FIG. 2, the remote system(s) 104 may optimize the launching of the network applications on the virtual servers 120. For example, after a network application is installed onto a first virtual server 120, the launching component 214 of the first virtual server 120 may cause the network application to launch, execute, and then terminate.

In some examples, the launching component 214 originally causes the network application to launch based on the remote system(s) 104 assigning a first user device 222 (which may represent, and/or include, the first user device 108 and/or the second user device 126) to the first virtual server 120. While the first virtual server is launching, executing, and/or terminating the network application, the monitoring component 216 may monitor the launching, the executing, and/or the terminating in order to identify events associated with the network application.

As described above, in some examples, the events may include each of the processes that were created and/or executed during the launching, the executing, and/or the terminating of the network application. For example, the events may include, but are not limited to, files that are loaded by the network application, files created during the launching of the network application, files created during the execution of the network application, registries created, registries updated, dependencies on other applications and/or network resources, other application dependent files that are read, written, updated, and/or executed, protection software that protects against malicious activities (e.g., anti-cheat software), a shader cache that is downloaded and/or generated, user data (e.g., entitlements, game saves, etc.) that is generated and/or retrieved for the network application, and/or any other type of event. In some examples, the monitoring component 216 may then filter the events in order to identify specific types of events for optimizing the launching of the network application.

The optimization component 208 of the remote system(s) 104 may then analyze events data 224, representing the events, in order to determine how to optimize the launching of the network application. In some examples, the optimization component 208 analyzes the events by identifying event(s) that caused delays in the launching of the network application on the first virtual server 120. For a first example, the optimization component 208 may analyze the events data 224 in order to identify file(s) that take the longest to load during the launching of the network application. In some examples, the optimization component 208 identifies a set number of files (e.g., one file, two files, five files, ten files, and/or etc.) that take the longest period(s) of time to load. In some examples, the optimization component 208 identifies file(s) that include loading time(s) that exceed a threshold period of time (e.g., ten seconds, thirty seconds, one minute, two minutes, etc.). In either of the examples, the optimization component 208 may then generate code representing commands to preload these file(s) before launching the network application.

For a second example, the optimization component 208 may analyze the events data 224 in order to identify protection software, which is downloaded, and protects against malicious activities. In some examples, such as when the network application includes a network game, the protection software may include anti-cheat software downloaded by the first virtual server 120, where the anti-cheat software analyzes file(s) of the network game in order to determine if the file(s) were maliciously altered. The optimization component 208 may then generate code representing commands to pre-download this protection software and/or preload the file(s) that this software analyzes for the malicious activities. For a third examples, optimization component 208 may analyze the events data 224 in order to determine that a shader cache 226 was downloaded and/or generated during the launching and/or execution of the network application.

The optimization component 208 may then generate code representing commands to download and/or generate the shader cache 226.

For a fourth example, the optimization component 208 may analyze the events data 224 in order to identify that the network application depends on other application(s) and/or network service(s). The optimization component 208 may then generate code representing commands to pre-download and/or preinstall these other application(s) and/or network service(s). Still, for a fifth example, the optimization component 208 may analyze the events data 224 in order to identify registries that were created and/or updated by the network application. The optimization component 208 may then generate code representing commands to generate and/or update the registries before launching the network application. While these are just a couple of example processes that the optimization component 208 may identify for optimizing the launching, the executing, and/or the terminating of the network application using the events data 224, in other examples, the optimization component 208 may identify additional and/or alternative processes.

While the above examples describe the optimization component 208 analyzing the events data 224 in order to determine the process(es) for optimizing the launching, the executing, and/or the terminating of the network application, in other examples, the optimization component 208 may use inputs from one or more users when determining the process (es) for optimizing the launching, the executing, and/or the terminating of the network application. For example, the user interface component 212 may generate a user interface that includes information describing the events, which is discussed in more detail with regard to FIG. 6. For instance, the user interface may include information describing the files that were loaded during the launching of the network application, the amount of time that it took for the files to be loaded, the number of processes that accessed the files, and/or any other information. The remote system(s) 104 may then send, over network(s) 228, user interface data 230 representing the user interface to an electronic device 232. Using the user interface data 230, the electronic device 232 may display the user interface to a user. The electronic device 232 may then receive inputs representing process(es) for optimizing the launching, the executing, and/or the terminating of the network application.

For example, the electronic device 232 may receive inputs associated with preloading one or more files, inputs associated with downloading the protection software that protects against malicious activities, inputs associated with downloading the shader cache, inputs associated with preloading additional applications and/or network services, and/or inputs representing one or more additional and/or alternative optimization processes. The remote system(s) 104 may then receive, from the electronic device 232 and over the network(s) 228, input data 234 representing the inputs and/or representing the optimization process(es) input by the user. Using the input data 234, the optimization component 208 may then generate the code representing the commands to perform the optimization process(es) input by the user of the electronic device 232.

The optimization component 208 may then generate the optimization data 114 representing the code for optimizing the launching, the executing, and/or the terminating of the network application. After generating the optimization data 114, the remote system(s) 104 may store the optimization data 114 in the memory 206, such as persistent memory 236. Additionally, in some examples, the optimization data 208 may be specific to the network application and/or the version of the network application. As such, the monitoring component 216 may generate application information 116 associated with the network application. As described herein, the application information 116 may represent, but is not limited to, binaries associated with the network application, files associated with the network application, a resolution of the network application, graphics quality settings of the network application, display settings associated with the network application, artifacts that depend on progress through the network application, and/or the like. The remote system(s) 104 may then store the application information 116 in associated with the optimization data 114.

Furthermore, in some examples, the optimization data 114 may be specific to the hardware and/or software associated with the first virtual server 120. The hardware and/or software may include, but is not are not limited to, a number of CPU cores associated with processor(s) 238, an amount of RAM associated with memory 240, a type, size and/or count of attached volumes, an operating system 242 of the first virtual server 120, bundled drivers of the first virtual server 120, APIs associated with the first virtual server 120, third-party application installed on the first virtual server 120, and/or any other hardware and/or software. As such, the monitoring component 216 may generate system information 116 representing the hardware and/or software. The remote system(s) 104 may then store the system information 116 in association with the optimization data 114.

After generating the optimization data 114, the remote system(s) 104 are able to use the optimization data 114 in order to optimize the launching, the executing, and/or the terminating of the network application on other virtual servers 120. For example, and for a second virtual server 120, the remote system(s) 104 may cause the network application to install on the second virtual server 120. The acceleration component 210 of the remote system(s) 104 may then retrieve the optimization data 114 associated with the network application and provide the second virtual server 120 with the optimization data 114. In some examples, the acceleration component 210 retrieve the optimization data 114 using information 116 associated with the network application and/or the second virtual server 120.

For a first example, the monitoring component 216 of the second virtual server 120 may generate additional application information 116 associated with the network application installed on the second virtual server 120. The acceleration component 210 may receive and compare the additional application information 116 to the application information 116 that is stored in association with the optimization data 114. If the acceleration component 210 determines that the additional application information 116 is similar to the application information 116 that is stored in association with the optimization data 114, then the acceleration component 210 may determine that the second virtual server 120 may use the optimization data 114 for the launching, the executing, and/or the terminating of the network application. However, if the acceleration component 210 determines that the additional application information 116 is not similar to the application information 116 that is stored in association with the optimization data 114, then the acceleration component 210 may determine that the second virtual server 120 may not use the optimization data 114 for the launching, the executing, and/or the terminating of the network application.

For a second examples, and additionally to, or alternatively from using the additional application information 116, the monitoring component 216 may generate additional system information 116 associated with the hardware and/or software of the second virtual server 120. The acceleration component 210 may then receive and compare the additional system information 116 to the system information 116 that is stored in association with the optimization data 114. If the acceleration component 210 determines that the additional system information 116 is similar to the system information 116 that is stored in association with the optimization data 114, then the acceleration component 210 may determine that the second virtual server 120 may use the optimization data 114 for the launching, the executing, and/or the terminating of the network application. However, if the acceleration component 210 determines that the additional system information 116 is not similar to the system information 116 that is stored in association with the optimization data 114, then the acceleration component 210 may determine that the second virtual server 120 may not use the optimization data 114 for the launching, the executing, and/or the terminating of the network application.

After receiving the optimization data 114, the monitoring component 216 initially executes code represented by the optimization data 114 before the launching component 214 causes the launching of the network application. For a first example, if the code represents the commands to preload file(s) before launching the network application, then the monitoring component 216 may load the file(s) before launching the network application. In some examples, the monitoring component 216 may load the file(s) in a cache associated with the operating system 242. This may reduce the number of times that the operating system 242 has to read from a disk when launching the network application, which may reduce the total time that it takes to launch the network application.

For a second example, if the code represents the commands to pre-download the protection software that protects against malicious activities and/or preload the file(s) that this protection software analyzes for the malicious activities, then the monitoring component 216 may pre-download the software and/or preload the file(s). This way, the software may begin to analyze the file(s) before the launching of the network application and/or during the initial processes of the launching. For a third example, if the code represents the commands to download and/or generate the shader cache 226, the monitoring component 216 may download and/or generate the shader cache 226 before the launching of the network application and/or during the initial processes of the launching. In some examples, the monitoring component 216 downloads the shader cache 226 from the virtual storage device 218. For example, the remote system(s) 104 may retrieve the shader cache 226 from the first virtual server 120 and then store the shader cache 226 on the virtual storage devices 218 with the application data 220.

For a fourth example, if the code represents commands to pre-download and/or preinstall other application(s) and/or network service(s), then the monitoring component 216 may pre-download and/or preinstall these other application(s) and/or network service(s). Still, for a fifth example, if the code represents commands to generate and/or update the registries before launching the network application, then the monitoring component 216 may generate and/or update the registries before the launching of the network application. While these are just a couple of example processes that the monitoring component 216 may perform for optimizing the launching, the executing, and/or the terminating of the network application using the optimization data 114, in other examples, the monitoring component 216 may perform additional and/or alternative processes.

The launching component 214 of the second virtual server 120 may then cause the launching, the executing, and/or the terminating of the network application on the second virtual server 120. In some examples, the launching component 214 originally causes the network application to launch based on the remote system(s) 104 assigning a second user device 222 to the second virtual server 120. Additionally, in some examples, the monitoring component 216 of the second virtual server 120 may monitor the launching, the executing, and/or the terminating of the network application in order to identify additional events. For example, if a user of the network application advances further in the network application than other users (e.g., the user reaches a game level that others users have yet to reach), the monitoring component 216 may monitor the executing of the network application in order to identify additional events that occur. The remote system(s) 104 may then perform the processes described above to continue to generate new optimization data 114 using additional events data 224 representing these additional events. In other words, the monitoring component 216 may continue to monitor the launching, the executing, and/or the terminating of the network application in order to continue identifying events that the remote system(s) 104 may use to generate optimization data 114 for the network application.

As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network Interface(s) may enable communication of data between the electronic device and one or more other remote systems, as well as other networked devices. The network interface(s) may include one or more network interface controllers (NICs) or other types of transceiver devices to send and receive messages over the network(s). For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

Figure 3A:
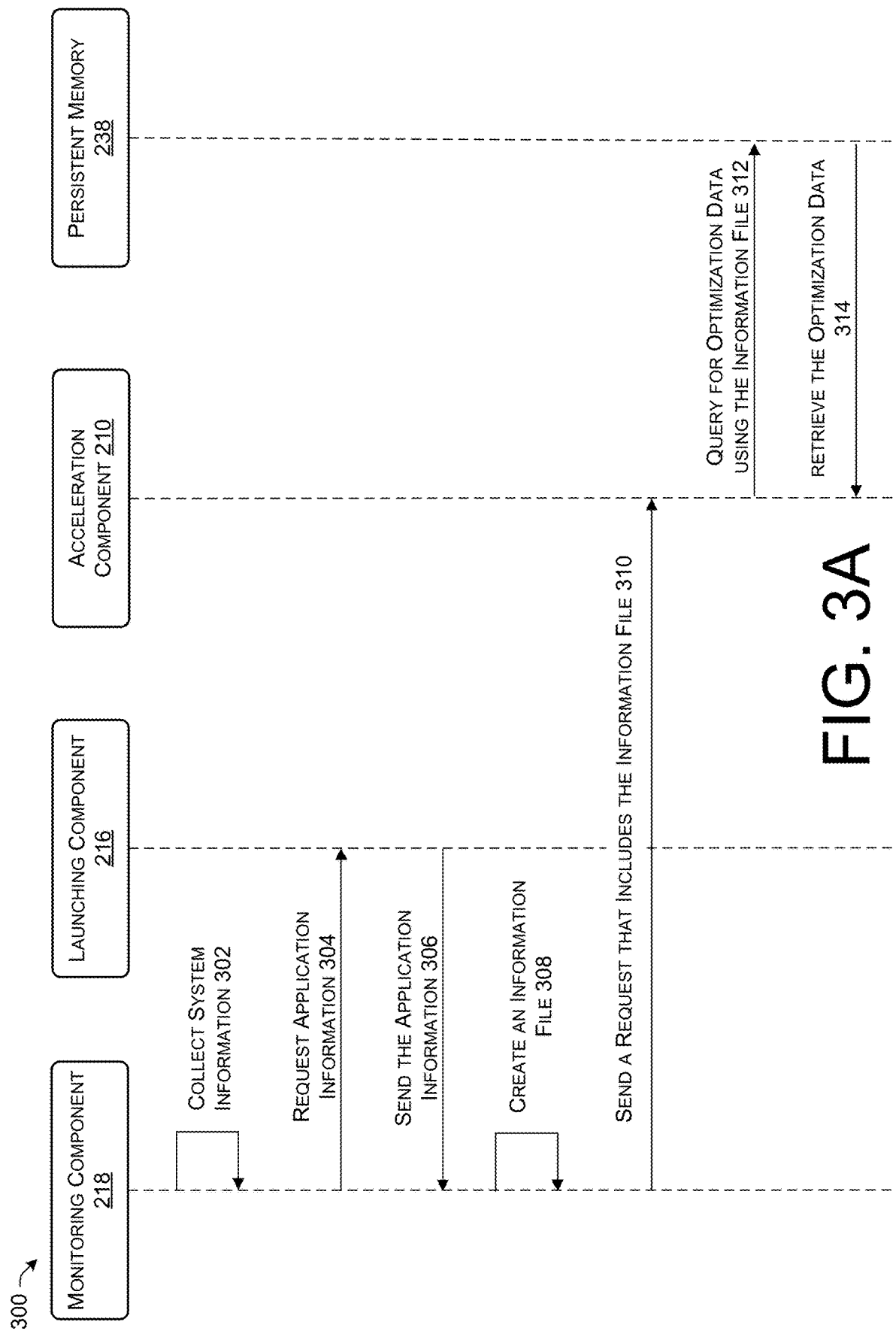

FIGS. 3A-3B illustrate an example process 300 for performing optimization processes before launching a network application, in accordance with examples of the present disclosure. At 302, the monitoring component 216 may collect system information. For instance, the monitoring component 216 may analyze the virtual server 120 in order to determine the system information 116. The system information 116 may include, but is not are not limited to, a number of CPU cores associated with processor(s) 238, an amount of RAM associated with memory 240, a type, size and/or count of attached volumes, an operating system 242 of the virtual server 120, bundled drivers of the virtual server 120, APIs associated with the virtual server 120, third-party application installed on the virtual server 120, and/or any other hardware and/or software.

At 304, the monitoring component 216 may request application information from the launching component 214 and at 306, the launching component 214 may send the application information to the monitoring component 216. For instance, the launching component 214 may analyze the network application in order to determine the application information 116. The application information 116 may include, but is not limited to, binaries associated with the network application, files associated with the network application, a resolution of the network application, graphics quality settings of the network application, display settings associated with the network application, artifacts that depend on progress through the network application, and/or the like. The monitoring component 216 may then receive the application information 116 from the launching component 214.

At 308, the monitoring component 216 may create an information file and at 310, the monitoring component 216 may send, to the acceleration component 210, a request that includes the information file. For instance, the monitoring component 216 may generate the information file that includes at least the application information 116 and the system information 116. The monitoring component 216 may then send the information file to the acceleration component 210 along with a request for the optimization data 114.

At 312, the acceleration component 210 may query for optimization data using the information file and at 314, the acceleration component 210 may receive the optimization data from the persistent memory 236. For instance, the acceleration component 210 may analyze the persistent memory 236 using the application information 116 and/or the system information 116 from the information file in order to determine if the optimization data 114 exists for the network application. In some examples, the acceleration component 210 may determine that the optimization data 114 exists based on the application information 116 and/or the system information 116 from the information file matching application information 116 and/or system information 116 associated with the optimization data 114. In some examples, based on determining that the optimization data 114 exists, the acceleration component 210 may then retrieve the optimization data 114 from the persistent memory 236. After retrieving the optimization data, and at 316, the acceleration component 210 may then send the optimization data to the monitoring component 216.

At 318, the monitoring component 216 may execute a command associated with the optimization data. For instance, the monitoring component 216 may execute the command in order to optimize the launching the network application. In some examples, executing the command may cause the monitoring component 216 to load file(s) in a cache associated with the operating system 242, pre-download the software and/or preload the file(s) that the software analyzes, download and/or generate the shader cache 226, pre-download and/or preinstall other application(s) and/or network service(s), generate and/or update registries, and/or the like. After executing the command, and at 320, the monitoring component 216 may notify the launching component 214 that the network application is ready to launch.

FIG. 4 illustrates an example process 400 for launching and then executing the network application from FIGS. 3A-3B, in accordance with examples of the present disclosure. At 402, the launching component 214 may notify the monitoring component 216 to start monitoring a network application and at 404, the launching component 214 may use application data to launch the network application. For instance, and as described above, the monitoring component 216 may continue to monitor the launching, the executing, and/or the terminating of the network application. As such, before the launching the network application, the launching component 214 may notify the monitoring component 216 to begin the monitoring. In some examples, the optimization data 114 indicates types of events to monitor for during the launching, the executing, and/or the terminating of the network application.

At 406, the operating system 242 may perform activities associated with the network application and at 408, the monitoring component 216 may record the activities as events. For instance, the operating system 242 may begin loading files of the network application, creating files for the network application, creating registries, updating registries, loading other applications and/or network resources, reading other application dependent files, downloading protection software, downloading and/or generating a shader cache, and/or performing one or more additional and/or alternative activities associated with the launching and/or the executing of the network application. The monitoring component 216 may then record these activities as events.

At 410, the monitoring component 216 may send, to the acceleration component 210, events data representing the events and at 412, the acceleration component 210 may send, to the monitoring component 216, incremental optimization data. For instance, the monitoring component 216 may then generate and send, to the acceleration component 210, the events data 224 representing the events. The monitoring component 216 may then receive, from the acceleration component 210, optimization data 114 for optimizing the launching, the executing, and/or the terminating of the network application. For example, as the user progresses through the network application, the acceleration component 210 may continue to send the monitoring component 216 the optimization data 114 so that the monitoring component 216 may continue to optimize the launching, the executing, and/or the terminating of the network application.

For instance, and at 414, the monitoring component 216 may execute code represented by the incremental data. For example, the monitoring component 216 may continue to execute the code represented by the optimization data 114 as the network application is being launched, executed, and/or terminated. In some examples, executing the code may cause the monitoring component 216 to load additional file(s) in a cache associated with the operating system 242, download and/or generate an additional shader cache 226, install other application(s) and/or network service(s), generate and/or update registries, and/or perform one or more additional and/or alternative processes.

Figure 5:
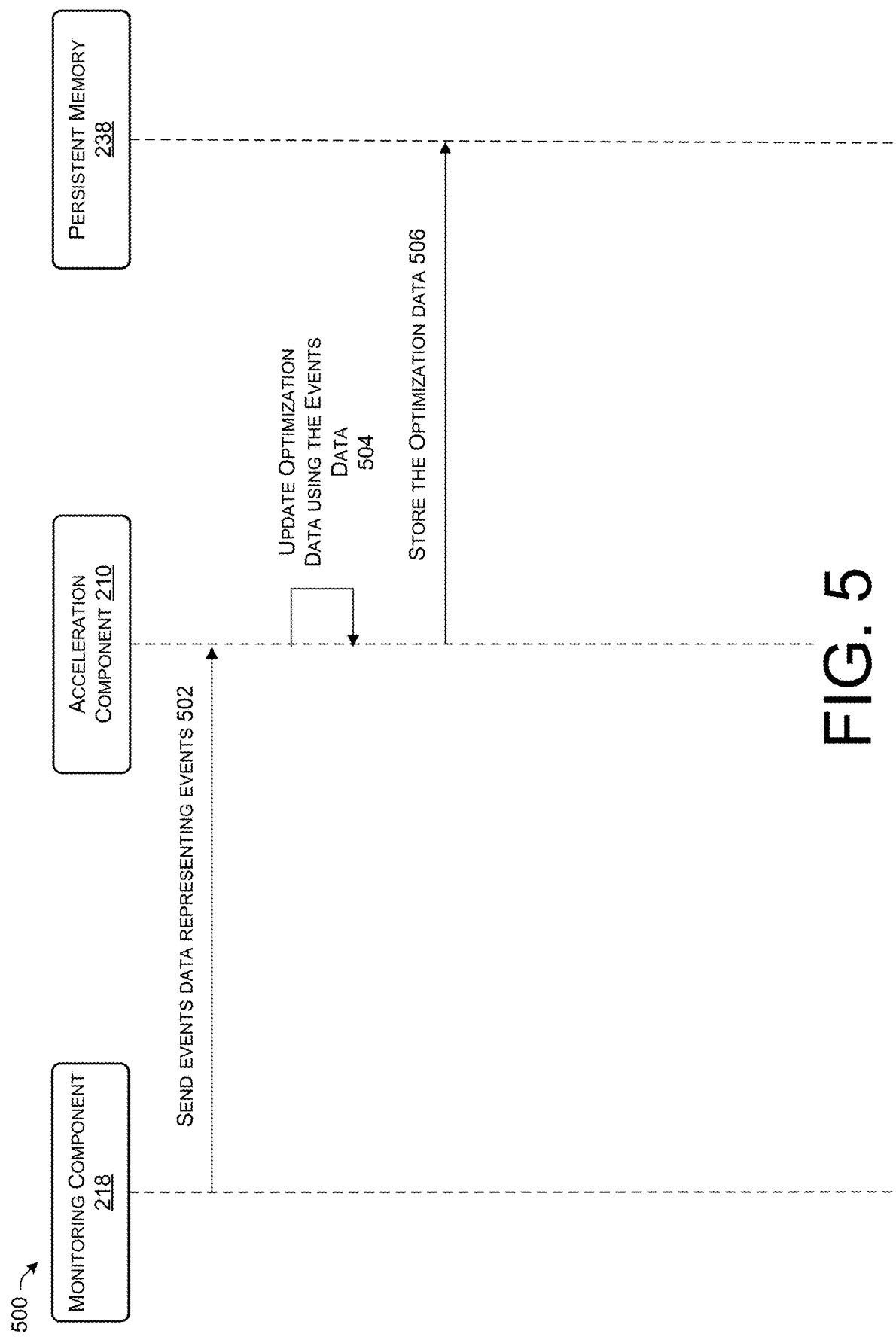
FIG. 5 illustrates an example process for terminating the network application from FIGS. 3A-3B, in accordance with examples of the present disclosure.

FIG. 5 illustrates an example process 500 for terminating the network application from FIGS. 3A-3B, in accordance with examples of the present disclosure. At 502, the monitoring component 216 may send, to the acceleration component 210, events data representing events. For instance, while executing and terminating the network application, the operating system 242 may continue to load files of the network application, create files for the network application, create registries, update registries, load other applications and/or network resources, read other application dependent files, download protection software, download and/or generate a shader cache, and/or perform one or more additional and/or alternative activities. The monitoring component 216 may then record these activities as events. Additionally, when terminating the network application, the monitoring component 216 may then send, to the acceleration component 210, the events data 224 representing the events.

At 504, the acceleration component 210 may update optimization data using the events data. For instance, the acceleration component 210 may generate new optimization data 114 based on the events represented by the events data 224. In some examples, the new optimization data 114 represents updates to the optimization data 114 already stored in the persistent memory 236. In some examples, the new optimization data 114 represents additional optimization data 114 to add to the optimization data 114 already stored in the persistent memory 236. In either of the examples, and at 506, the acceleration component 210 may then store the optimization data in the persistent memory 236.

Figure 6:
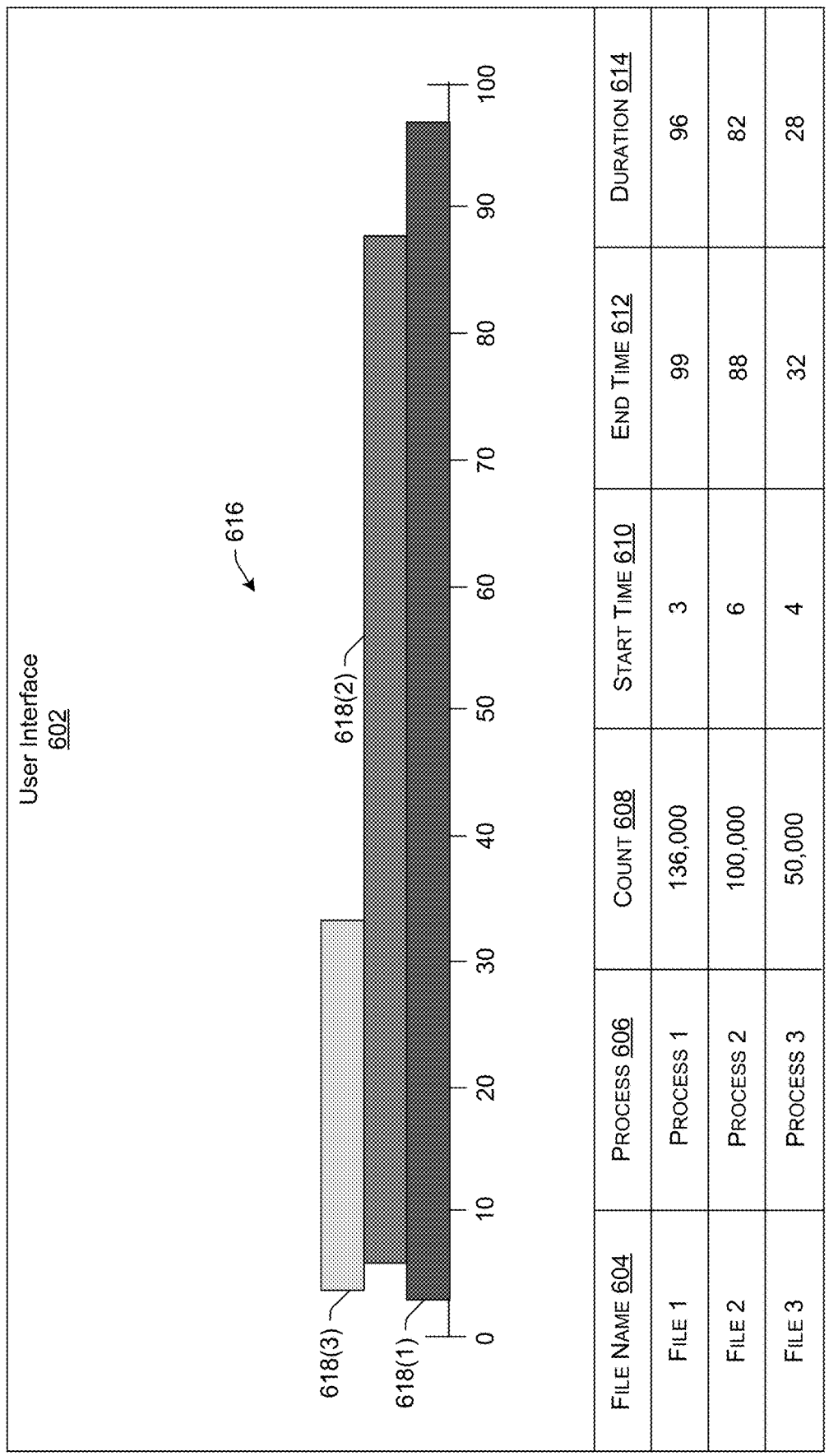
FIG. 6 illustrates an example user interface for providing events associated with a network application, in accordance with examples of the present disclosure.

FIG. 6 illustrates an example user interface 602 for providing events associated with a network application, in accordance with examples of the present disclosure. In the example of FIG. 6, the user interface 602 may provide events associated with loading files of the network application. However, in other examples, the user interface 602 may provide other types of events associated with launching, executing, and/or terminating the network application. Additionally, while the user interface 602 is providing information for three different files in the example of FIG. 6, in other examples, the user interface 602 may provide information for any number of files (e.g., 10 files, 100 files, 1,000 files, etc.).

As shown, the user interface 602 includes at least file names 604, processes 606 associated with the files, counts 608 associated with the files, start times 610 for the files, end times 612 for the files, and durations 614 associated with the files. The file name 604 may include, but is not limited to, the name of the file, the address of the file, the type of file, and/or the like. Additionally, the process 606 may indicate the process(es) that accessed, loaded, downloaded, read, and/or wrote the file. Furthermore, the count 608 may indicate the number of times that the file was accessed, loaded, downloaded, read, and/or written. Finally, the start time 610 may indicate a time that the file began being processed, the end time 612 may indicate a time that the file was finished being processed, and the duration 614 may indicate the difference between the start time 610 and the end time 612.

As further illustrated in the example of FIG. 6, the user interface 602 may include a graph 616 illustrating the times that files were processed. For instance, the graph 616 includes a first interface element 618(1) indicating times that File 1 was being processed and/or accessed, a second interface element 618(2) indicating times that File 2 was being processed and/or accessed, and a third interface element 618(3) indicating times that File 3 was being processed and/or accessed. Although the interface elements 618(1)-(3) in the example of FIG. 6 indicate that the files were continuously processed and/or accessed between the start times 610 and the end times 612, in other examples, the interface elements 618(1)-(3) may indicate that the files were not continuously being processed and/or accessed. For example, a file may initially be processed between 5 second and 10 seconds. The file may then again be processed between 30 seconds and 40 seconds.

In the example of FIG. 6, a user is able to determine which files are taking the longest duration during a launching of the network application. For example, the user is able to determine that File 1 is taking the longest to process (e.g., 96 seconds), the File 2 is taking the second longest to process (e.g., 82 seconds), and File 3 is taking the third longest to process (e.g., 28 seconds) during the launching of the network application. As such, the user may provide inputs to preload File 1, File 2, and/or File 3 before launching the network application. By preloading File 1, File 2, and/or File 3, the user optimizes the launching of the network application in order to reduce the total period of time that it takes to launch the network application on a new virtual server 120.

Figure 7A:
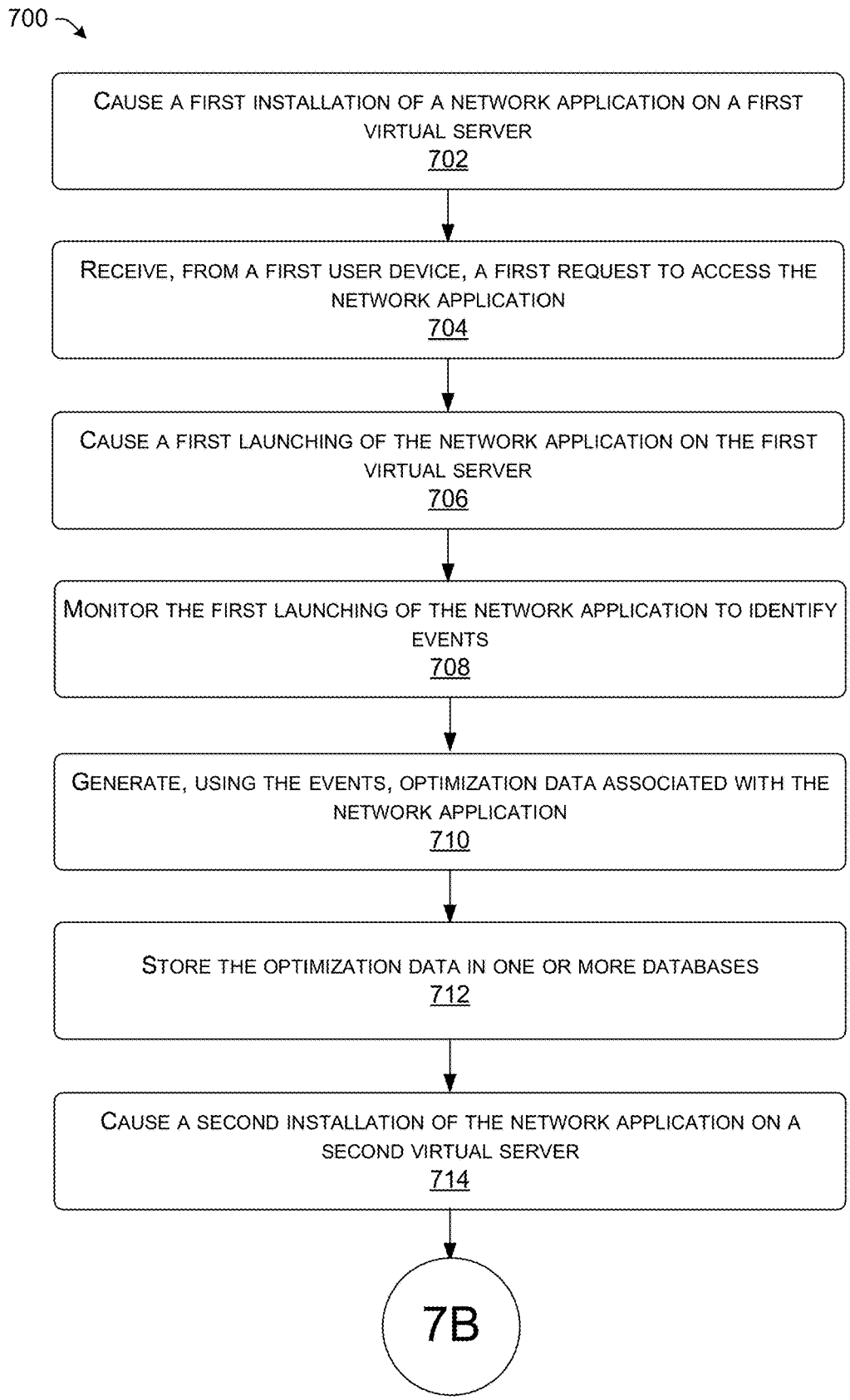
Figure 8:
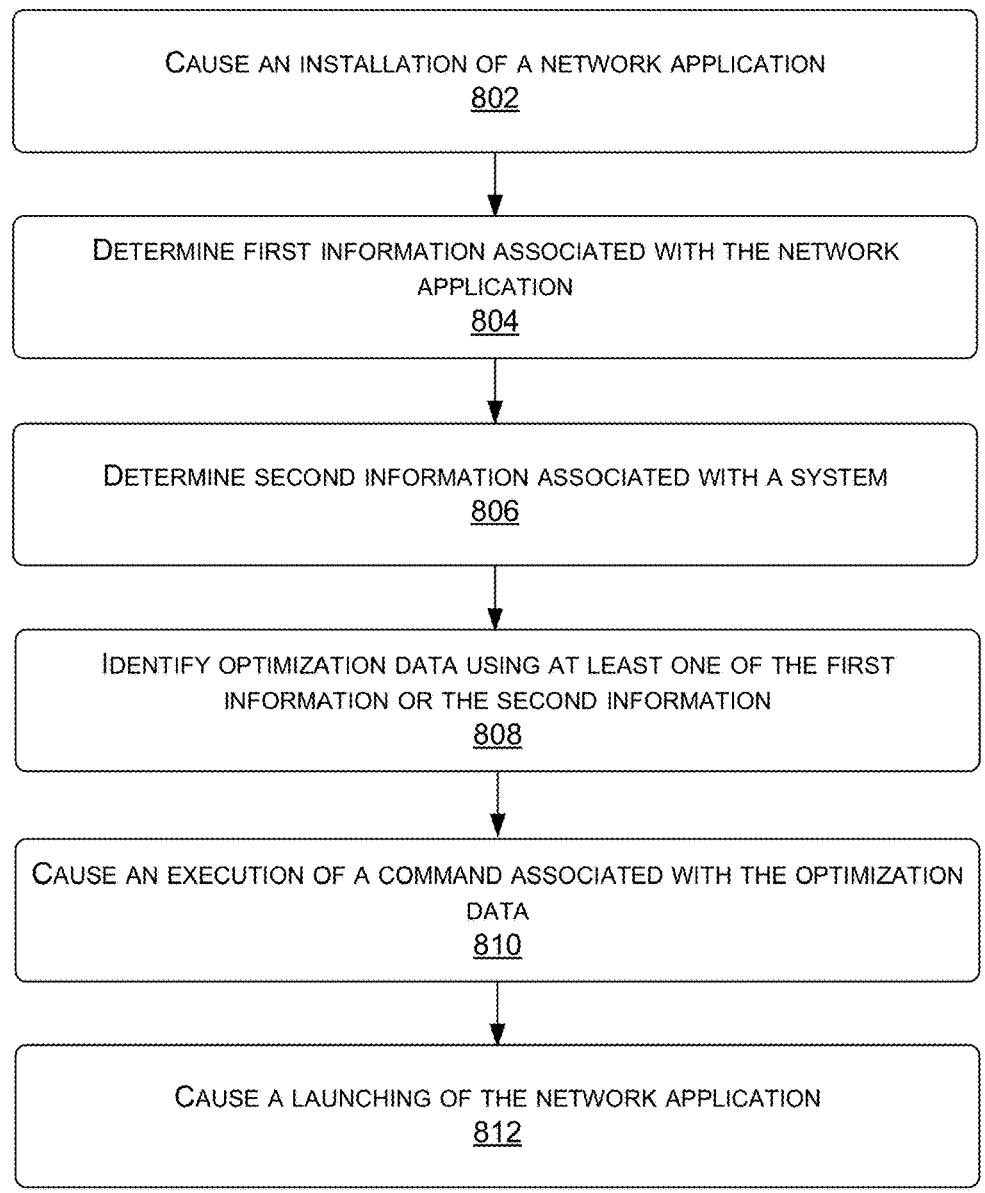
FIG. 8 illustrates an example process for optimizing a launching of a network application, in accordance with examples of the present disclosure.

FIGS. 7A-8 illustrate various processes for providing network applications. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIGS. 7A-7B illustrate an example process 700 for using events from a first launching of a network application on a first virtual server in order to optimize a second launching of the network application on a second virtual server, in accordance with examples of the present disclosure. At 702, the process 700 may include causing a first installation of a network application on a first virtual server and 704, the process 700 may include receiving, from a first user device, a first request to access the network application. For instance, the remote system(s) 104 may cause the network application to be installed on the first virtual server. In some examples, the remote system(s) 104 may cause the first installation using one or more virtual storage devices. The remote system(s) 104 may then receive the first request from the first user device and, based on receiving the first request, assign the first user device to the first virtual server.

At 706, the process 700 may include causing a first launching of the network application on the first virtual server and 708, the process 700 may include monitoring the first launching of the network application to identify events. For instance, based on assigning the first user device with the first virtual server, the remote system(s) 104 may cause the first launching of the network application on the first virtual sever. In some examples, the first launching takes a first period of time. Additionally, the remote system(s) 104 may generate and/or receive events data representing the events that occurred during the first launching of the network application. In some examples, the remote system(s) 104 may then filter the events in order to identify specific types of events that the remote system(s) 104 may use for later optimizing the launching of the network application.

At 710, the process 700 may include generating, using the events, optimization data associated with the network application and at 712, the process 700 may include storing the optimization data in one or more databases. For instance, in some examples, the remote system(s) 104 may analyze the events to determine one or more processes that may occur to optimize the launching of the network application. Additionally, or alternatively, in some examples, the remote system(s) 104 may receive input data representing the one or more processes. In either of the examples, the remote system(s) 104 may then generate the optimization data representing code, where the code represents commands to perform the one or more process. The remote system(s) 104 may then store the optimization code in the one or more databases. Additionally, in some examples, the remote system(s) 104 may store application information and/or system information in association with the optimization code.

At 714, the process 700 may include causing a second installation of the network application on a second virtual server and 716, the process 700 may include retrieving the optimization data from the one or more databases. For instance, the remote system(s) 104 may cause the network application to be installed on the second virtual server. In some examples, the remote system(s) 104 may cause the second installation using one or more virtual storage devices. The remote system(s) 104 may then retrieve the optimization data from the one or more databases. In some examples, the remote system(s) 104 identify the optimization data using additional application data and/or additional system information associated with the second virtual server.

At 718, the process 700 may include causing, using the optimization data, one or more processes to occur before a second launching of the network application. For instance, the remote system(s) 104 may cause an execution of the optimization data, where the execution causes a running of the code represented by the optimization data. As described herein, the one or more processes may include, but are not limited to, preloading file(s), creating file(s), downloading file(s), preloading software, downloading software, downloading a shader cache, registering the network application, and/or performing one or more other additional and/or alternative processes.

At 720, the process 700 may include receiving, from a second user device, a second request to access the network application and at 722, the process 700 may include causing a second launching of the network application on the second virtual server. For instance, the remote system(s) 104 may receive the second request from the second user device and, based on receiving the second request, assign the second user device to the second virtual server. The remote system(s) 104 may then cause the second launching of the network application on the second virtual sever. In some examples, the second launching takes a second period of time that is less than the first period of time. This may be because the remote system(s) 104 caused the one or more processes to occur before the second launching of the network application on the second virtual sever.

FIG. 8 illustrates an example process 800 for optimizing a launching of a network application, in accordance with examples of the present disclosure. At 802, the process 800 may include causing an installation of a network application. For instance, the remote system(s) 104 (and/or a virtual server) may cause the installation of the network application. In some examples, the remote system(s) 104 cause the installation on a virtual server. In some instances, installing the network application may include at least installing software files, registry keys, services, protection software, a shader cache, and/or other resources associated with the network application.

At 804, the process 800 may include determining first information associated with the network application and at 806, the process 800 may include determining second information associated with a system. For instance, the remote system(s) 104 (and/or the virtual server) may generate and/or receive the first information and/or the second information. The first information may represent, but is not limited to, binaries associated with the network application, files associated with the network application, a resolution of the network application, graphics quality settings of the network application, display settings associated with the network application, artifacts that depend on progress through the network application, and/or any other information associated with the network application. Additionally, the second information may include, but is not limited to, a number of CPU cores associated with the system, an amount of RAM on the system, a type, size and/or count of attached volumes, an operating system of the system, bundled drivers of the system, APIs associated with the system, third-party application installed on the system, and/or any other information associated with hardware and/or software of the system.

At 808, the process 800 may include identifying optimization data using at least one of the first information or the second information. For instance, the remote system(s) 104 (and/or the virtual server) may use the first information and/or the second information to identify the optimization data. The remote system(s) 104 (and/or the virtual server) may then cause an execution of the optimization data. As described herein, the one or more processes may include, but are not limited to, preloading file(s), creating file(s), downloading file(s), preloading software, downloading software, downloading a shader cache, registering the network application, and/or performing one or more other additional and/or alternative processes.

At 810, the process 800 may include causing an execution of a command associated with the optimization data. For instance, the remote system(s) may cause the execution of the command in order to optimize the launching the network application. In some examples, executing the command may cause the virtual server to load file(s) in a cache associated with the operating system 242, pre-download the software and/or preload the file(s) that the software analyzes, download and/or generate the shader cache 226, pre-download and/or preinstall other application(s) and/or network service(s), generate and/or update registries, and/or the like.

At 812, the process 800 may include causing a launching of the network application. For instance, the remote system(s) 104 (and/or the virtual server) may cause the launching of the network application. In some examples, the remote system(s) 104 (and/or the virtual server) cause the launching after the execution of the optimization data. In some examples, the remote system(s) 104 (and/or the virtual server) cause the launching based on a user device being assigned to the virtual server.

Figure 9:
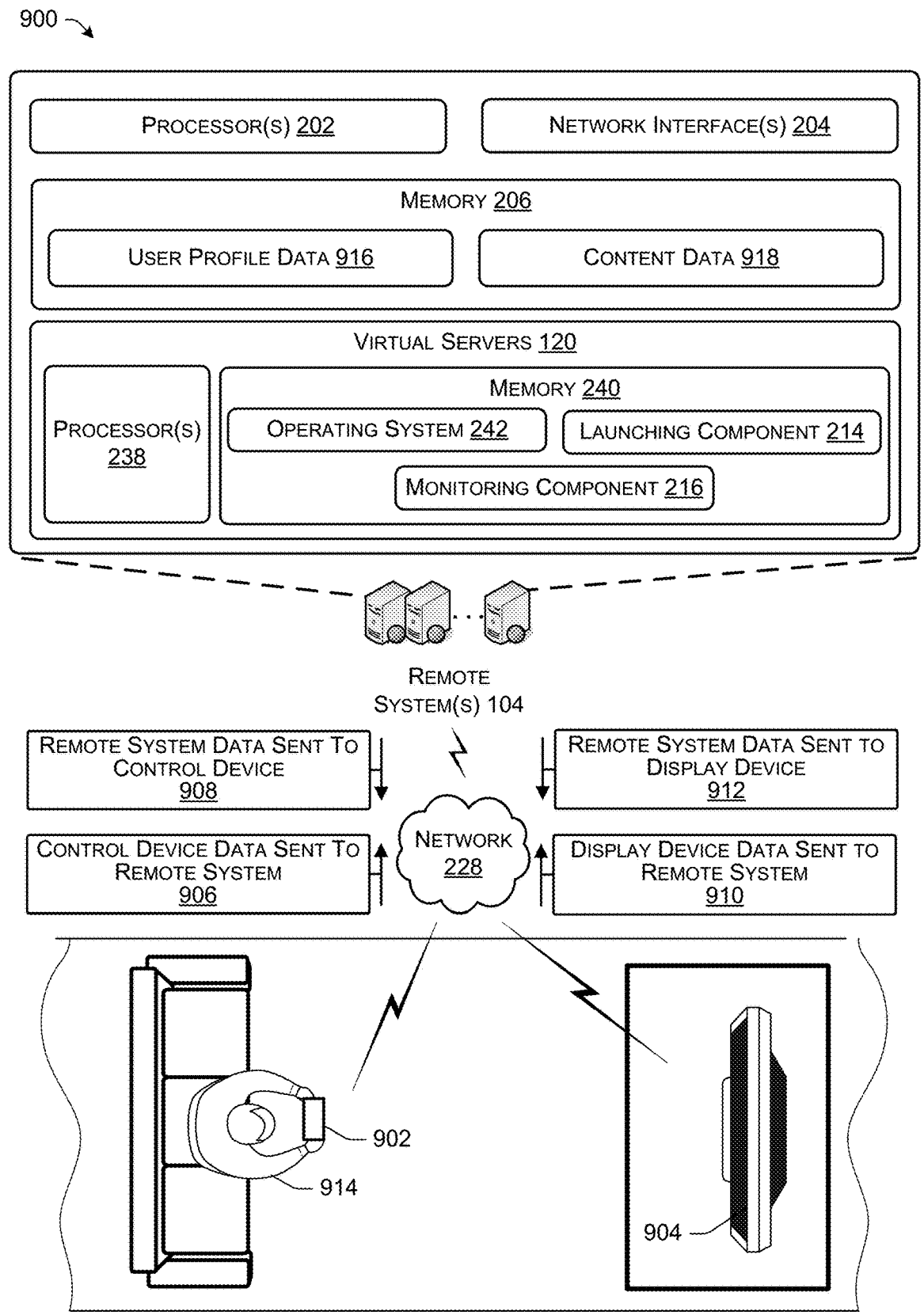
FIG. 9 illustrates a schematic diagram of an example system for controlling network applications, in accordance with examples of the present disclosure.

FIG. 9 is a schematic diagram of an example system 900 for controlling network applications, in accordance with examples of the present disclosure. The system 900 may include, for example, the remote system(s) 104, a control device 902, and a display device 904. In the example of FIG. 9, the control device 902 may communicate with the remote system(s) 104 over the network(s) 228, such as by using a first communication channel. For instance, the control device 902 may send data to the remote system(s) 104 (which is represented by 906) and the remote system(s) 104 may send data to the control device 902 (which is represented by 908). Additionally, the display device 904 may communicate with the remote system(s) 104 over the network(s) 228, such as by using a second communication channel. For instance, the display device 904 may send data to the remote system(s) 104 (which is represented by 910) and the remote system(s) 104 may send data to the display device 904 (which is represented by 912).

By sending and receiving data with the control device 902 and the display device 904, the remote system(s) 104 allow a user 914 to control, via the remote system(s) 104, the network application being displayed by the display device 904 using the control device 902. For instance, the control device 902 may connect to the network(s) 228, such as by using configuration settings. The control device 902 may then send, to the remote system(s) 104, identifier data representing at least an identifier associated with the control device 902. The remote system(s) 104 may receive the data and determine, using user profile data 916, that the data is received from the control device 902. For example, the remote system(s) 104 may match the identifier represented by the data received from the control device 902 with an identifier associated with the user profile data 916. Based at least in part on the match, the remote system(s) 104 may determine that the data was sent from the control device 902.

The remote system(s) 104 may further determine, using the user profile data 916, that the control device 902 is associated with at least the display device 904. For example, and based at least in part on determining that the data was sent from the control device 902, the remote system(s) 104 may analyze the user profile data 916 associated with the user 914. The remote system(s) 104 may then determine that the user profile data 916 includes and/or is associated with data representing an identifier of the display device 904. Based at least in part on the determination, the remote system(s) 104 may determine that the control device 902 is associated with the display device 904.

In some instances, the remote system(s) 104 may then send, to the display device 904, content data 918 (e.g., video data, audio data, etc.) representing one or more network applications that are available to the user 914. In some instances, the one or more network applications may include one or more applications that have been acquired by the user 914 (e.g., the one or more network applications represented by the application data 220). Additionally, or alternatively, in some instances, the one or more network applications may include one or more network applications that are free to users. In either example, the display device 904 may receive the content data 918 from the remote system(s) 104. The display device 904 may then display image(s) that represent the one or more network applications that are available to the user 914. For example, the image(s) may include one or more identifiers (e.g., one or more names) of the one or more network applications that are available to the user 914.

The remote system(s) 104 may then receive, from the control device 902, input data (which may be represented by 906) representing input(s) received by the control device 902. The remote system(s) 104 may analyze the input data to identify a network application that is selected by the user 914. For example, the input(s) may correspond to movement(s) of an object, such as a cursor, across the image(s) representing the one or more network applications. The input(s) may further correspond to a selection of one of the network applications (e.g., a selection of a control on the control device 902 when the object is located over the selected network application). The remote system(s) 104 may then determine, based at least in part on the selection, that the user 914 selected the network application.

The remote system(s) 104 may then assign the control device 902 and/or the display device 904 with a virtual server 120 associated with the network application. Additionally, the remote system(s) 104 may cause a launching of the network application on the virtual server 120, using one or more of the processes descried herein. Once the network application is launched, the remote system(s) 104 are able to provide content associated with the network application.

For example, the remote system(s) 104 may then send, to the display device 904, content data 918 representing a first state of the network application. The content data 918 may include first video data representing image(s) of the first state of the network application, first audio data representing sound corresponding to the first state of the network application, and/or first timestamp data representing a time for displaying the image(s) and/or a time for outputting the sound. The display device 904 may receive the content data 918 from the remote system(s) 104. Using the first video data, the display device 904 may display the image(s) representing the first state of the network application. For example, if the network application includes a network game, the display device 904 may display content representing the first state of the game. In the example of FIG. 9, the first state of the game may include an object (e.g., a character) located at a first position in a gaming environment (e.g., a forest). In some instances, the display device 904 may further output the sound represented by the first audio data.

In some instances, the display device 904 displays the image(s) and/or outputs the sound according to the time(s) represented by the first timestamp data. For example, the display device 904 may determine when a current time includes the time represented by the first timestamp data for displaying the first video data. Based at least in part on the determination, the display device 904 may begin displaying the image(s) representing the first state of the network application. Additionally, the display device 904 may determine when a current time includes the time represented by the first timestamp data for outputting the sound. Based at least in part on the determination, the display device 904 may begin outputting the sound represented by the first audio data.

In some instances, the remote system(s) 104 may additionally send, to the control device 902, content data 918 representing the first state of the network application. The content data 918 may include second audio data representing sound corresponding to the first state of the network application and/or second timestamp data representing a time for outputting the sound. The control device 902 may then output the sound represented by the second audio data. In some instances, the control device 902 may output the sound according to the time represented by the second timestamp data. In some instances, the first timestamp data and/or the second timestamp data synchronizes the outputting of the sound by the control device 902 with the displaying of the image(s) by the display device 904.

The user 914 may then use the control device 902 to provide inputs to the network application. For instance, the control device 902 may receive an input, such as a selection of a button, joystick, key, touch-sensitive pad, sensor, and/or the like associated with the control device 902. The control device 902 may then send, to the remote system(s) 104, input data representing the input. Using the input data, a remote system(s) 104 may update the first state of the network application to a second state of the network application. For example, and using the example above where the network application includes the network game, the input may be associated with moving the object forward by a given amount within the gaming environment. As such, the remote system(s) 104 may analyze the input data to determine that the input includes moving the object forward by the given amount. The remote system(s) 104 may then update the first state of the of the network application to the second state of the network application by moving the object forward in the environment by the given amount.

The remote system(s) 104 may then send content data 918 representing a second state of the network application to the display device 904. The content data 918 may include third video data representing image(s) of the second state of the network application, third audio data representing sound corresponding to the second state of the network application, and/or third timestamp data representing a time for displaying the image(s) and/or a time for outputting the sound. The display device 904 may receive the content data 918 from the remote system(s) 104. Using the third video data, the display device 904 may display image(s) representing the second state of the network application. For example, and again using the example where the network application includes the network game, the display device 904 may display the object located at the second position within the gaming environment. In some instances, the display device 904 may further output the sound represented by the third audio data. In some instances, the display device 904 displays the image(s) and/or outputs the sound according to the time(s) represented by the third timestamp data.

In some instances, the remote system(s) 104 may additionally send, to the control device 902, content data 918 representing the second state of the network application. The content data 918 may include fourth audio data representing sound corresponding to the second state of the network application and/or fourth timestamp data representing a time for outputting the sound. The control device 902 may then output the sound represented by the fourth audio data. In some instances, the control device 902 may output the sound according to the time represented by the fourth timestamp data. In some instances, third timestamp data and/or the fourth timestamp data synchronizes the outputting of the sound by the control device 902 with the displaying of the image(s) by the display device 904.

In some instances, the remote system(s) 104 may continue to receive input data from the control device 902. The remote system(s) 104 may then continue to process the input data in order to update the state of the network application. Based at least in part on the updating, the remote system(s) 104 may continue to send, to the display device 904, content data 918 (e.g., video data, audio data, timestamp data, etc.) representing the current state of the network application. The remote system(s) 104 may further send, to the control device 902, content data 918 (e.g., audio data, timestamp data, etc.) representing the current state of the network application. In other words, the remote system(s) 104 allow the user 914 to access the network application that is executing on the virtual server 120.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system comprising:
   one or more processors; and
   one or more computer-readable media storing instructions that, when executed by the one or more processors, cause the system to perform operations comprising:
   causing a first installation of a network game on a first virtual server;
   receiving, from a first user device, a first request to play the network game;
   based at least in part on receiving the first request, causing, during a first period of time, a first launching the network game on the first virtual server;

monitoring the first launching of the network game in order to identify at least a second period of time that it took to load a file associated with the network game;

determining, based at least in part on the second period of time, to subsequently preload the file before launching the network game;

generating optimization code representing a command to preload the file before a second launching the network game;

storing the optimization code in one or more databases;

causing a second installation of the network game on a second virtual server;

retrieving the optimization code from the one or more databases;

causing, using the optimization code, the file to be preloaded into a cache memory on the second virtual server;

receiving, from a second user device, a second request to play the network game; and based at least in part on receiving the second request, causing, during a third period of time, the second launching of the network game on the second virtual server, wherein the third period of time associated with the second launching of the network game is less than the first period of time associated with the first launching of the network game.

2. The system as recited in claim 1, the operations further comprising:

generating a user interface that includes at least the second period of time that it took to load the file associated with the network game;

sending, to an electronic device, user interface data representing the user interface; and receiving, from the electronic device, input data associated with preloading the file before the second launching the network game, and wherein determining to preload the file is based at least in part on the input data.

3. The system as recited in claim 1, the operations further comprising:

determining first information associated with at least one of first hardware or first software of the first virtual server;

determining second information associated with at least one of second hardware or second software of the second virtual server; and determining that the second information is similar to the first information, and wherein retrieving the optimization code is based at least in part on the second information being similar to the first information.

4. A method comprising:

installing a network application on a virtual server;

determining information associated with at least one of the network application or the virtual server;

identifying, based at least in part on the information, data for optimizing a launching of the network application on the virtual server;

executing, on the virtual server, a command associated with the data; and after executing the command, launching the network application on the virtual server.

5. The method as recited in claim 4, wherein:

the command is to install a file of the network application before launching the network application; and the method further comprises installing, based at least in part on executing the command, the file into a memory of the virtual server before launching the network application.

6. The method as recited in claim 4, wherein:

the command is to install a shader cache before launching the network application; and the method further comprises installing, based at least in part on executing the command, the shader cache onto the virtual server before launching the network application.

7. The method as recited in claim 4, wherein:

the command is to install, before launching the network application, software that monitors one or more files of the network application for malicious activities; and the method further comprises installing, based at least in part on executing the command, the software onto the virtual server before launching the network application.

8. The method as recited in claim 4, wherein:

the command is to register the network application before launching the network application; and the method further comprises generating, based at least in part on executing the command, a registry associated with the network application before launching the network application.

9. The method as recited in claim 4, wherein:

the command is to retrieve, before launching the network application, user data associated with the network application; and the method further comprises retrieving, based at least in part on the executing the command, the user data before launching the network application.

10. The method as recited in claim 4, further comprising:

monitoring launching of the network application in order to identify one or more events;

generating additional data representing the one or more events for updating the data; and sending the additional data to one or more computing devices.

11. The method as recited in claim 10, wherein monitoring launching of the network application in order to identify the one or more events comprises monitoring launching the network application in order to identify at least one of:

a first event associated with loading a first file of the network application;

a second event associated with creating a second file for the network application;

a third event associated with registering the network application;

a fourth event associated with a dependency on another application;

a fifth event associated with executing software for preventing malicious activities associated with the network application;

a sixth event associated with downloading a shader cache; or a seventh event associated with retrieving user data.

12. The method as recited in claim 4, further comprising:

while executing the network application, identifying additional data for optimizing loading of a portion of the network application; and executing, on the virtual server, an additional command associated with the additional data.

13. The method as recited in claim 4, further comprising:

launching the network application on an additional virtual server;

receiving additional data representing one or more events that occurred during launching of the network application on the additional virtual server; and generating the data based at least in part on the one or more events.

14. The method as recited in claim 13, further comprising:

determining additional information associated with at least one of the network application or the additional virtual server;

storing the second information in association with the data; and determining that the information is similar to the additional information, and wherein identifying the data is based at least in part on the information being similar to the additional information.

15. The method as recited in claim 13, further comprising:

generating a user interface representing the one or more events;

sending, to an electronic device, user interface data representing the user interface; and receiving, from the electronic device, input data associated with optimizing launching of the network application, and wherein generating the data is based at least in part on the input data.

16. The method as recited in claim 4, wherein determining the information comprises determining at least one of:

a binary associated with the network application;
a file associated with the network application;
a resolution associated with the network application;
a graphics quality associated with the network application;
a display setting associated with the network application;
an additional application to execute with the network application;
a number of cores associated with a central processing unit of the virtual server;
an amount of memory associated with the virtual server;
a type of a volume attached to the virtual sever;
a size of the volume;
an operating system of the virtual server;
a library installed on the virtual server;
a graphic adapter; or
systems devices.

17. The method as recited in claim 4, further comprising:

receiving, from a user device, a request to access the network application; and based at least in part on receiving the request, associating the user device with the virtual server, and wherein launching the network application is based at least in part on associating the user device with the virtual server.

18. A method comprising:

receiving first data representing one or more events that occurred during a first launching of a network application on a first virtual sever;

generating, based at least in part on the one or more events, second data for optimizing a second launching the network application;

storing the second data in one or more databases;

receiving, from a second virtual server, information associated with at least one of the network application or the second virtual sever; and sending, based at least in part on the information, the second data to the second virtual server.

19. The method as recited in claim 18, wherein the information is first information, and wherein the method further comprises:

receiving, from the first virtual server, second information associated with at least one of the network application or the first virtual server;

storing the second information in association with the second data; and determining that the first information is similar to the second information, and wherein sending the second data to the second virtual server is further based at least in part on the first information being similar to the second information.

20. The method as recited in claim 18, further comprising:

receiving third data representing one or more additional events that occurred during the second launching of a network application on the second virtual sever; and updating, based at least in part on the additional one or more events, the second data for optimizing a third launching of the network application.

* * * * *